(12) United States Patent
Kodama et al.

(10) Patent No.: US 11,598,298 B2
(45) Date of Patent: Mar. 7, 2023

(54) ENGINE INTAKE SYSTEM

(71) Applicant: Mazda Motor Corporation, Hiroshima (JP)

(72) Inventors: Shin Kodama, Aki-gun (JP); Kenji Sugasaki, Aki-gun (JP); Yuta Takamura, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/731,698

(22) Filed: Apr. 28, 2022

(65) Prior Publication Data

US 2022/0381210 A1    Dec. 1, 2022

(30) Foreign Application Priority Data

May 26, 2021    (JP) .............................. JP2021-088387

(51) Int. Cl.
*F02M 35/12*     (2006.01)
*F02M 35/16*     (2006.01)

(52) U.S. Cl.
CPC .............................. *F02M 35/1294* (2013.01)

(58) Field of Classification Search
CPC ........................... F02M 35/1294; F02M 35/16
See application file for complete search history.

(56) References Cited

U.S. PATENT DOCUMENTS

| | | | | |
|---|---|---|---|---|
| 7,975,802 B2 * | 7/2011 | Yokoya | ............ | F02M 35/10295 181/271 |
| 2011/0315472 A1 | 12/2011 | Ohta et al. | | |
| 2016/0265479 A1 * | 9/2016 | Nakashima | ........ | F02M 35/1294 |

FOREIGN PATENT DOCUMENTS

| | | | | | |
|---|---|---|---|---|---|
| EP | 2400142 | A1 * | 12/2011 | ....... | F02M 35/10295 |
| JP | 2008267220 | A * | 11/2008 | | |
| JP | 2009222011 | A * | 10/2009 | ....... | F02M 35/10295 |
| JP | 2012007502 | A | 1/2012 | | |
| JP | 6373159 | B2 * | 8/2018 | | |

OTHER PUBLICATIONS

Machine translation, JP6373159B2, obtained from https://worldwide.espacenet.com/, originally published Aug. 15, 2018, pp. 1-5. (Year: 2018).*

* cited by examiner

*Primary Examiner* — Grant Moubry
(74) *Attorney, Agent, or Firm* — Alleman Hall Creasman & Tuttle LLP

(57) ABSTRACT

An intake system of an engine is provided, including a first passage provided to an engine bay, for leading fresh air to the engine, a second passage branched from a branching part at an intermediate location of the first passage, and extending toward a cabin, and an intake noise increasing device provided to the second passage, and configured to increase intake pressure in response to an intake air pressure wave. The intake noise increasing device has a cylindrical bellows part configured to expand and contract in a cylindrical axis direction, and a vibrating membrane formed integrally with the bellows part to close a first opening of the bellows part. The second passage has an introducing passage section connected to a second opening of the bellows part, and extending toward the branching part, and the introducing passage section is disposed so as to be lowered while separating from the bellows part.

11 Claims, 2 Drawing Sheets

ENGINE INTAKE SYSTEM

TECHNICAL FIELD

The present disclosure relates to an intake system of an engine, particularly to an intake system provided with an intake noise increasing device which increases intake noise which is propagated to a cabin.

BACKGROUND OF THE DISCLOSURE

Some vehicles are provided with an intake noise increasing device which intentionally increases intake noise of an engine mounted in an engine bay, and propagates the intake noise into a cabin. A driver who operates the vehicle provided with such an intake noise increasing device can acquire the satisfaction of controlling the vehicle from the aspect of hearing a sound effect caused according to accelerator operation.

JP2012-007502A discloses a vehicle provided with an intake noise increasing device. The intake noise increasing device disclosed in JP2012-007502A has a cylindrical bellows part which can be expanded and contracted in the cylindrical axis direction, and a vibrating membrane formed integrally with the bellows part so as to close one of the openings of the bellows part. Further, the other opening of the bellows part in the intake noise increasing device is connected to an introducing passage section which is branched from the intake passage and used as a fresh air passage to the engine. A deriving passage section released toward the cabin is connected to the side of the intake noise increasing device where the vibrating membrane is formed.

The technology disclosed in JP2012-007502A widens the band of the intake noise propagated to the cabin by offsetting the piping centers of the introducing passage section and the deriving passage section from the center of the vibrating membrane in a direction along the principal surface of the vibrating membrane.

However, since the intake noise increasing device is mounted in an engine bay, condensation may form inside the intake noise increasing device according to a change in temperature inside the engine bay between an engine start and an engine stop. When condensation forms inside the intake noise increasing device, the condensation may adhere to the bellows part and the vibrating membrane. When the condensation adheres to the vibrating membrane, etc., the vibrating membrane vibrates less easily because of the influence of the mass of the condensation. Therefore, the frequency of the intake noise propagated to the cabin is deviated from a given designed frequency, and the noise volume decreases as well.

SUMMARY OF THE DISCLOSURE

The present disclosure is made in view of solving the above problems, and one purpose thereof is to provide an intake system of an engine, capable of propagating intake noise at a given frequency to a cabin while suppressing a decrease in volume, without being easily influenced by condensation which is produced according to a change in temperature inside an engine bay.

According to one aspect of the present disclosure, an intake system of an engine is provided, which includes a first passage, a second passage, and an intake noise increasing device. The first passage is a passage provided to an engine bay, for leading fresh air to the engine. The second passage is a passage branched from a branching part at an intermediate location of the first passage, and extending toward a cabin. The intake noise increasing device is provided to the second passage, and increases intake pressure in response to an intake air pressure wave.

The intake noise increasing device has a cylindrical bellows part and a vibrating membrane. The bellows part is a part configured to expand and contract in a cylindrical axis direction, and the vibrating membrane is a part formed integrally with the bellows part to close a first opening of the bellows part. The second passage has an introducing passage section connected to a second opening of the bellows part, and extending toward the branching part.

In the intake system, the introducing passage section is disposed so as to be lowered while separating from the bellows part.

Since the introducing passage section is disposed so as to be lowered while separating from the bellows part, even when condensation forms inside of the bellows part and the vibrating membrane according to the temperature change in the engine bay, the condensation is easily discharged toward the introducing passage section from the bellows part. Therefore, according to this configuration, it is difficult to cause a frequency change in the intake noise due to adhesion of the condensation to an inner surface of the vibrating membrane, etc., and the noise volume decrease is also difficult to occur.

When a center axis perpendicular to the vibrating membrane and passing through the membrane center of the vibrating membrane is a first center axis, and a center axis of the introducing passage section is a second center axis, an intersection of the first center axis and the second center axis may be disposed on an opening plane of the second opening.

Since the intersection of the first center axis and the second center axis is disposed on the opening plane of the second opening, an intake air pressure wave propagated through the introducing passage section is easily propagated to the vibrating membrane. Therefore, according to this configuration, the vibrating membrane can be vibrated effectively, and the intake noise can be propagated to the cabin at a given designed frequency.

The second passage may further have a deriving passage section connected to a part of the second passage on the opposite side of the introducing passage section with respect to the intake noise increasing device, and extending toward the cabin. When a center axis of the deriving passage section is a third center axis, an intersection of the first center axis and the third center axis may be disposed on an opening plane of an opening of the deriving passage section on the connection side with the intake noise increasing device.

Since the intersection of the first center axis and the third center axis is disposed on the opening plane of the opening of the deriving passage section, it is possible to propagate the intake noise, which is increased by the vibration of the vibrating membrane, with little loss to the deriving passage section. Therefore, according to this configuration, the intake noise which is increased by the intake noise increasing device can be propagated to the cabin certainly.

The intake noise increasing device may further have an outer circumferential case that is an external cylinder provided to cover an outer circumference of the bellows part, and allows the expansion and contraction of the bellows part therein. The deriving passage section may be joined to the outer circumferential case.

Since the intake noise increasing device has the outer circumferential case, the impediment of the vibration of the vibrating membrane and the expansion and contraction of the bellows part due to the connection of the introducing passage section and the deriving passage section is difficult to occur. Therefore, according to this configuration, the intake noise can be propagated to the cabin at the given designed frequency while suppressing the decrease in volume.

The vibrating membrane may be provided so that the first center axis is disposed in a front-and-rear direction of a vehicle.

Since the first center axis is oriented in the front-and-rear direction of the vehicle, the vibrating membrane vibrates in the front-and-rear direction of the vehicle in response to the intake air pressure wave. Therefore, according to this configuration, the increased pressure wave generated by the vibration of the vibrating membrane is propagated toward the cabin at the rearward, and thereby, the propagation of the intake noise to the cabin is made effectively.

The introducing passage section may be disposed so that a lower surface of the introducing passage section is located at or lower than the height of a lower surface of the second opening of the bellows part, in a connecting part with the bellows part.

Since the lower surface of the introducing passage section is located at or lower than the height of the lower surface of the bellows part, in the connecting part between the introducing passage section and the bellows part, the condensation produced inside the bellows part is well discharged to the introducing passage section. Therefore, according to this configuration, it is possible to reduce the condensation which remains inside the bellows part, and it is effective for suppressing the influence of the condensation on the vibration of the vibrating membrane.

DETAILED DESCRIPTION OF THE DISCLOSURE

Figure 1:
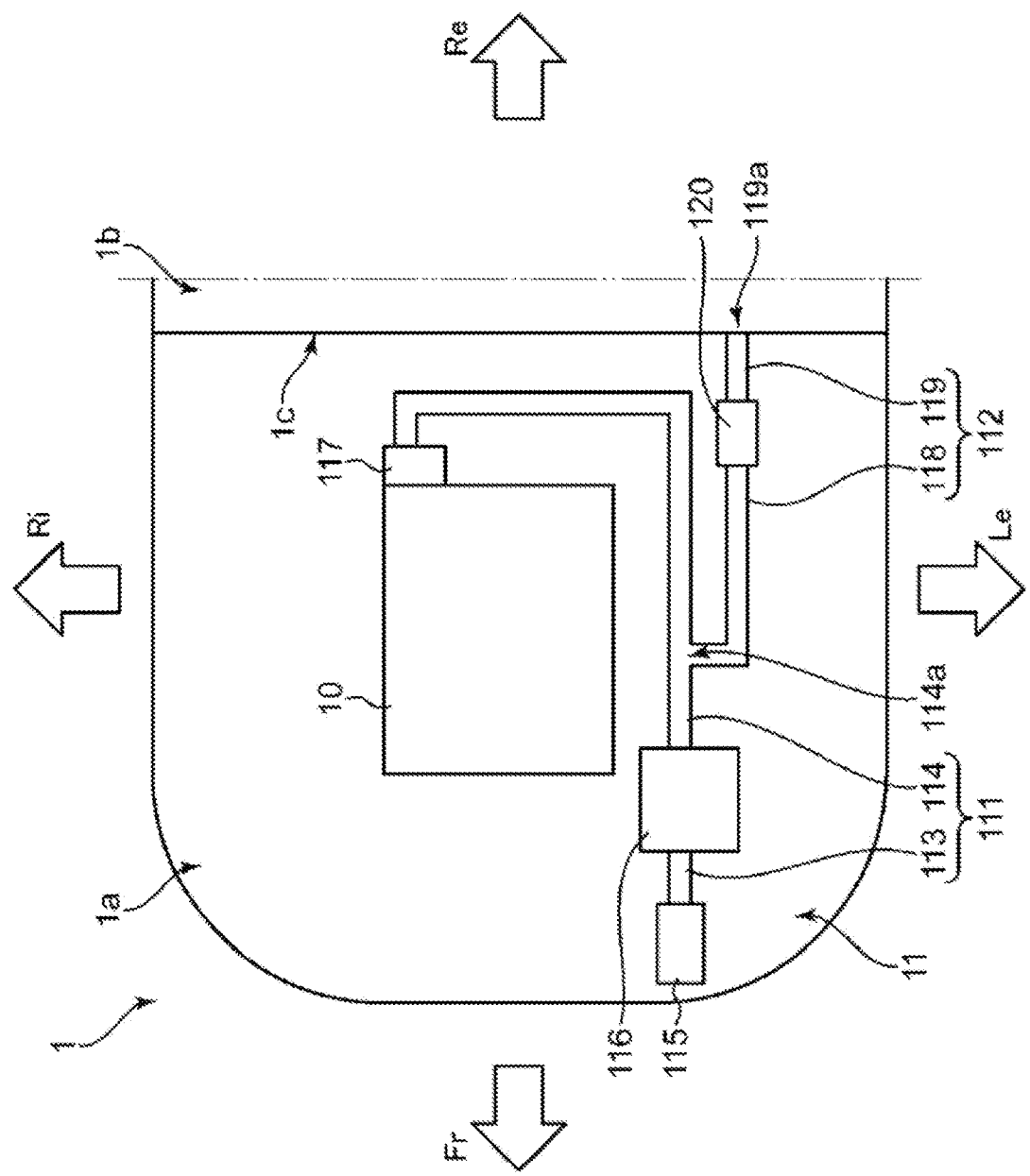
FIG. 1 is a schematic diagram illustrating an engine bay to which an intake system of an engine according to one embodiment of the present disclosure is applied.

Hereinafter, one embodiment of the present disclosure is described taking the accompanying drawings into consideration. Note that the aspect described as follows is one example of the present disclosure, and the present disclosure is not limited in any way to the following aspects, except for its essential configurations.

In the drawings used in the following explanation, "Fr" indicates forward of a vehicle, "Re" indicates rearward, "Le" indicates leftward, "Ri" indicates rightward, "Up" indicates upward (vertically upward), and "Lo" indicates downward (vertically downward).

1. Configuration of Engine Bay 1a

A structure of an engine bay 1a to which an intake system 11 of an engine 10 according to one embodiment of the present disclosure is applied is described using FIG. 1.

As illustrated in FIG. 1, the engine bay 1a is provided in a front part of a vehicle 1. The engine 10 is mounted in the engine bay 1a. In the vehicle 1, a cabin 1b is provided behind the engine bay 1a via a dash panel 1c.

The intake system 11 is attached to the engine 10 mounted in the engine bay 1a. The intake system 11 includes a first passage 111, a second passage 112, and an intake noise increasing device 120. The first passage 111 is the intake passage for supplying fresh air to each cylinder. A fresh air duct 115 is provided to one end of the first passage 111, and an air cleaner 116 and a throttle valve 117 are inserted into a rear side in the flow direction of the fresh air. A part of the first passage 111 upstream of the air cleaner 116 in the flow direction of the fresh air is referred to as an "upstream passage section 113," and a part downstream of the air cleaner 116 is referred to as a "downstream passage section 114."

The second passage 112 is a passage provided to the downstream passage section 114 so that it is branched at a branching part 114a of the downstream passage section 114. The intake noise increasing device 120 is inserted into an intermediate part of the second passage 112 in the longitudinal direction. A part of the second passage 112 on the branching part 114a side of the intake noise increasing device 120 is referred to as an "introducing passage section 118," and a part on the opposite side of the introducing passage section 118 with respect to the intake noise increasing device 120 is referred to as a "deriving passage section 119." A pipe-end part 119a on the rear side in the deriving passage section 119 opens near the dash panel 1c.

Note that as for the deriving passage section 119, a rear part may be inserted into the dash panel 1c, and the pipe-end part 119a may be disposed inside the cabin 1b.

2. Configuration of Intake Noise Increasing Device 120 and its Vicinity

Figure 2:
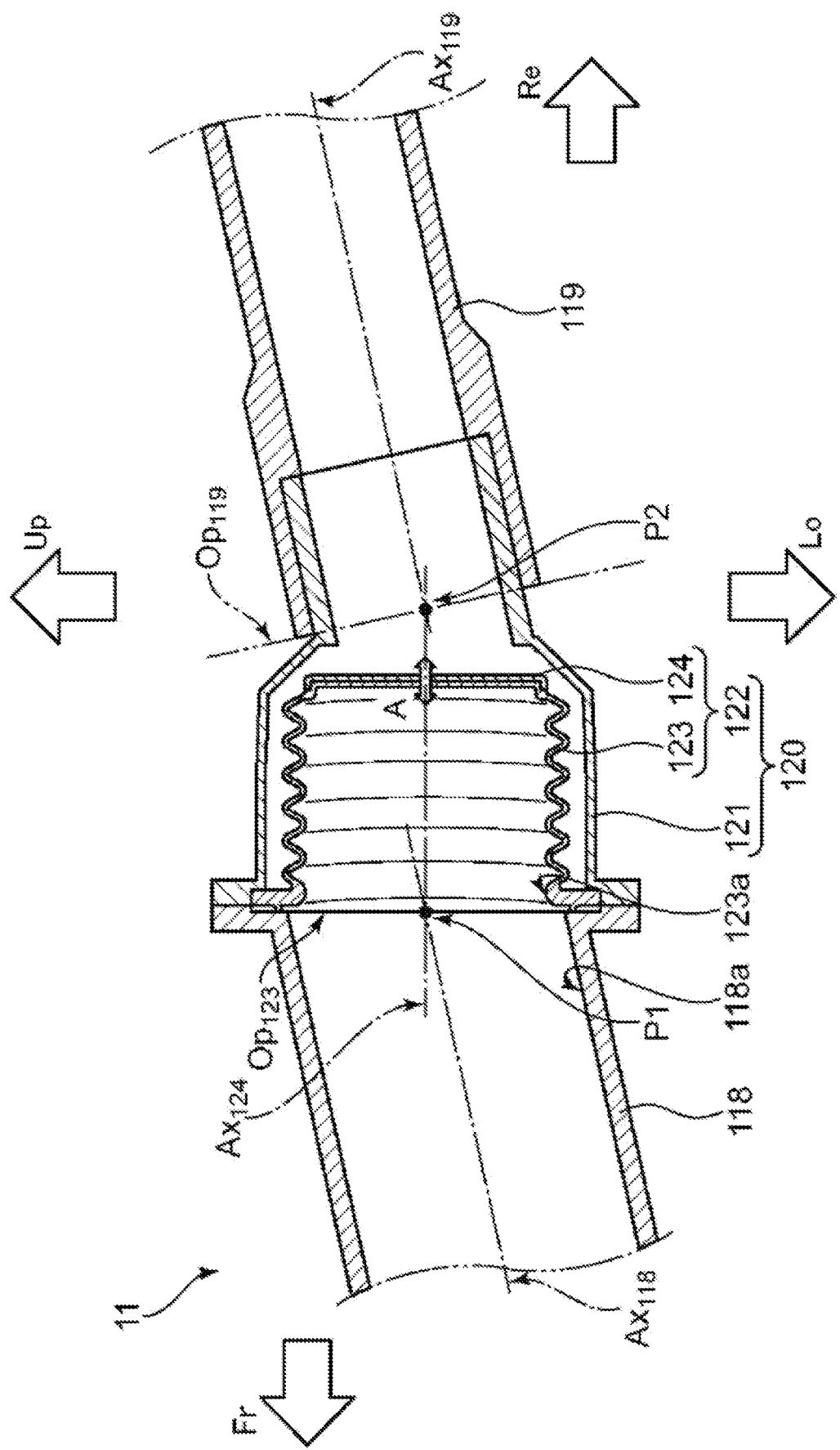
FIG. 2 is a cross-sectional view illustrating a configuration of an intake noise increasing device and its vicinity.

The configuration of the intake noise increasing device 120 and its vicinity among the configuration of the intake system 11 is described using FIG. 2.

As illustrated in FIG. 2, the intake noise increasing device 120 includes a cylindrical outer circumferential case 121, and a vibration body 122 accommodated in the outer circumferential case 121. The vibration body 122 includes a bellows part 123 in which an outer circumferential wall is formed in bellows shape, and a vibrating membrane 124 provided so as to close a rear opening of the bellows part 123. The bellows part 123 can expand and contract in the front-and-rear direction of the vehicle 1, and the vibrating membrane 124 can vibrate in the front-and-rear direction of the vehicle 1, as illustrated by an arrow A. The bellows part 123 and the vibrating membrane 124 are formed integrally.

The outer circumferential case 121 is disposed in a non-contact state so that it does not impede the expansion and contraction of the bellows part 123 and the vibration of the vibrating membrane 124.

The introducing passage section 118 and the deriving passage section 119 are connected to the intake noise increasing device 120. Among these, the introducing passage section 118 is connected to an opening $Op_{123}$ which is formed in the bellows part 123 on the opposite side from the vibrating membrane 124. An intake air pressure wave propagated through the introducing passage section 118 passes through the opening $Op_{123}$ of the bellows part 123, and is introduced into the bellows part 123.

The deriving passage section 119 is connected to a part of the outer circumferential case 121 rearward from the outer circumferential case 121. In detail, the outer circumferential case 121 is formed in a state where it extends in a direction separating from the bellows part 123, beyond the vibrating membrane 124 which is provided so as to close one opening of the bellows part 123. Further, the deriving passage section 119 is fitted and connected onto the extended part of the outer circumferential case 121.

As illustrated in FIG. 2, in this embodiment, the vibrating membrane 124 is disposed substantially in the vertical direction. Here, assuming a center axis $Ax_{124}$ which is perpendicular to the vibrating membrane 124 and passes through the membrane center of the vibrating membrane 124. Further, assuming that the center axis of the piping which constitutes the introducing passage section 118 is a "center axis $Ax_{118}$," and the center axis of the piping which constitutes the deriving passage section 119 is a "center axis $Ax_{119}$."

The introducing passage section 118 is connected to the intake noise increasing device 120 so that an intersection P1 of the center axis $Ax_{118}$ and the center axis $Ax_{124}$ is located on an opening plane of the opening $Op_{123}$ of the bellows part 123. Further, the introducing passage section 118 is disposed in an inclined posture so that the height is lowered gradually while separating from the opening $Op_{123}$ of the bellows part 123.

The deriving passage section 119 is connected to the intake noise increasing device 120 so that an intersection P2 of the center axis $Ax_{119}$ and the center axis $Ax_{124}$ is located on an opening plane of an opening $Op_{119}$ of the deriving passage section 119. The deriving passage section 119 is disposed in an inclined posture so that the height is increased gradually while separating from the vibrating membrane 124.

Note that as for the posture of the deriving passage section 119, it is not limited to the posture illustrated in FIG. 2. It may be a posture extending horizontally, or may be an inclined posture so that the height is lowered gradually while separating from the vibrating membrane 124.

Further, as illustrated in FIG. 2, in a connecting part between the introducing passage section 118 and the bellows part 123, a lower surface 118a of the introducing passage section 118 is disposed at or lower than the height of a lower surface 123a of the bellows part 123. The introducing passage section 118 is connected to the bellows part 123 so that neither a recess nor a groove is caused between the lower surface 118a of the introducing passage section 118 and the lower surface 123a of the bellows part 123.

3. Effects

In the intake system 11 according to this embodiment, since the introducing passage section 118 is disposed in the inclined posture so that it is lowered as it separates from the bellows part 123 (since it is disposed in the inclined posture illustrated in FIG. 2), the condensation is easily discharged toward the introducing passage section 118 from the bellows part 123, even when the condensation forms inside of the bellows part 123 and the vibrating membrane 124 according to the temperature change in the engine bay 1a. Therefore, in the intake system 11 according to this embodiment, it is difficult to cause a frequency change in the intake noise propagated to the cabin 1b due to adhesion of the condensation to an inner surface of the vibrating membrane 124, etc., and the noise volume decrease is also difficult to occur.

In the intake system 11 according to this embodiment, since the intersection P1 of the center axis $Ax_{118}$ of the introducing passage section 118 and the center axis $Ax_{124}$ of the vibrating membrane 124 is disposed on the opening plane of the opening $Op_{123}$ of the bellows part 123, the intake air pressure wave propagated through the introducing passage section 118 is easily propagated to the vibrating membrane 124. Therefore, in the intake system 11, the vibrating membrane 124 can be vibrated effectively, and the intake noise can be propagated to the cabin 1b at a given designed frequency, while suppressing the decrease in volume.

In the intake system 11 according to this embodiment, since the intersection P2 of the center axis $Ax_{119}$ of the deriving passage section 119 and the center axis $Ax_{124}$ of the vibrating membrane 124 is disposed on the opening plane of the opening $Op_{119}$ of the deriving passage section 119, it is possible to certainly propagate the intake noise, which is increased by the vibration of the vibrating membrane 124, to the deriving passage section 119. Therefore, in the intake system 11, the intake noise which is increased by the intake noise increasing device 120 can be propagated to the cabin 1b with little loss.

In the intake system 11 according to this embodiment, since the intake noise increasing device 120 has the outer circumferential case 121, the impediment of the vibration of the vibrating membrane 124 and the expansion and contraction of the bellows part 123 due to the connection of the introducing passage section 118 and the deriving passage section 119 is difficult to occur. Therefore, in the intake system 11, the intake noise can be propagated to the cabin 1b at the given designed frequency.

In the intake system 11 according to this embodiment, since the center axis $Ax_{124}$ of the bellows part 123 is oriented in the front-and-rear direction of the vehicle 1, the vibrating membrane 124 vibrates in the front-and-rear direction of the vehicle 1 in response to the intake air pressure wave. Therefore, in the intake system 11, the increased pressure wave generated by the vibration of the vibrating membrane 124 is propagated toward the cabin 1b at the rearward, and thereby, the propagation of the intake noise to the cabin 1b is made effectively.

In the intake system 11 according to this embodiment, since the lower surface 118a of the introducing passage section 118 is located at or lower than the height of the lower surface 123a of the bellows part 123, in the connecting part between the introducing passage section 118 and the bellows part 123, the condensation produced inside the bellows part 123 is well discharged to the introducing passage section 118, without stagnating inside the bellows part 123. Therefore, in the intake system 11, it is possible to reduce the condensation which remains inside the bellows part 123, and it is effective for suppressing the influence of the condensation on the vibration of the vibrating membrane 124.

As described above, in the intake system 11 according to this embodiment, it is difficult to be influenced by the condensation produced according to the temperature change in the engine bay 1a, and the intake noise at the given frequency can be propagated to the cabin 1b, while suppressing the decrease in volume.

Modifications

Although in the above embodiment the engine bay 1a is provided in the front part of the vehicle 1, the present disclosure is not limited to this configuration. For example, the engine bay may be provided behind the cabin.

Although in the above embodiment the throttle valve 117 is disposed rearward of the engine 10, the present disclosure is not limited to this configuration. For example, the throttle valve may be disposed at the side of or forward of the engine.

Although in the above embodiment the pipe-end part 119a of the deriving passage section 119 is located near the dash panel 1c inside the engine bay 1a, the present disclosure is not limited to this configuration. For example, the piping which constitutes the deriving passage section may be penetrated through the dash panel, and the pipe-end part may be located inside the cabin.

Although in the above embodiment the type of the engine 10 is not described in particular, various types of engines are applicable. For example, a gasoline engine and a diesel engine are applicable. Further, a reciprocating engine and a rotary piston engine are also applicable.

Although in the above embodiment the deriving passage section 119 goes up while separating from the intake noise increasing device 120, the present disclosure is not limited to this configuration in the layout of the deriving passage section. For example, it may be disposed horizontally, or it may go down while separating from the intake noise increasing device.

Although in the above embodiment the center axis $Ax_{124}$ of the vibrating membrane 124 is disposed substantially in the horizontal direction, the present disclosure is not limited to this configuration in the layout of the vibrating membrane. For example, the center axis of the vibrating membrane may be disposed in the vertical direction, or the center axis of the vibrating membrane may be disposed obliquely to both the horizontal direction and the vertical direction.

Although in the above embodiment the introducing passage section 118 is extended up to the branching part 114a of the downstream passage section 114 in the first passage 111, the present disclosure is not limited to this configuration in the layout of the introducing passage section. For example, another passage section may be inserted between the branching part of the downstream passage section and the introducing passage section.

Although in the above embodiment the deriving passage section 119 is extended up to near the dash panel 1c, the present disclosure is not limited to this configuration in the layout of the deriving passage section. For example, another passage section which connects the part near the dash panel to the deriving passage section may be disposed.

Although in the above embodiment one intake noise increasing device 120 is provided to the engine bay 1a, the present disclosure is not limited to this configuration in the number of intake noise increasing devices. For example, a plurality of intake noise increasing devices with different sizes are provided to propagate intake noises at different frequencies to the cabin. Note that, in this case, it is desirable to adjust the cross-sectional diameters and the passage lengths of the introducing passage section and the deriving passage section which are connected to the respective intake noise increasing devices, according to the frequencies to be obtained.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
1a Engine Bay
10 Engine
11 Intake System
111 First Passage
112 Second Passage
118 Introducing Passage Section
119 Deriving Passage Section
120 Intake Noise Increasing Device
122 Vibration Body
123 Bellows Part
124 Vibrating Membrane

What is claimed is:

1. An intake system of an engine, comprising:
a first passage provided to an engine bay, for leading fresh air to the engine;
a second passage branched from a branching part at an intermediate location of the first passage, and extending toward a cabin; and
an intake noise increasing device provided to the second passage, and configured to increase intake pressure in response to an intake air pressure wave,
wherein the intake noise increasing device has a cylindrical bellows part configured to expand and contract in a cylindrical axis direction, and a vibrating membrane formed integrally with the bellows part to close a first opening of the bellows part,
wherein the second passage has an introducing passage section connected to a second opening of the bellows part, and extending toward the branching part,
wherein the introducing passage section is disposed so as to be lowered while separating from the bellows part, and
wherein when a center axis perpendicular to the vibrating membrane and passing through the membrane center of the vibrating membrane is a first center axis, and a center axis of the introducing passage section is a second center axis, an intersection of the first center axis and the second center axis is disposed on an opening plane of the second opening.

2. The intake system of claim 1,
wherein the second passage further has a deriving passage section connected to a part of the second passage on the opposite side of the introducing passage section with respect to the intake noise increasing device, and extending toward the cabin, and
wherein when a center axis of the deriving passage section is a third center axis, an intersection of the first center axis and the third center axis is disposed on an opening plane of an opening of the deriving passage section on the connection side with the intake noise increasing device.

3. The intake system of claim 2, wherein the vibrating membrane is provided so that the first center axis is disposed in a front-and-rear direction of a vehicle.

4. The intake system of claim 2, wherein the introducing passage section is disposed so that a lower surface of the introducing passage section is located at or lower than a height of a lower surface of the second opening of the bellows part, in a connecting part with the bellows part.

5. The intake system of claim 2,
wherein the intake noise increasing device further has an outer circumferential case that is an external cylinder provided to cover an outer circumference of the bellows part, and allows the expansion and contraction of the bellows part therein, and
wherein the deriving passage section is joined to the outer circumferential case.

6. The intake system of claim 5, wherein the introducing passage section is disposed so that a lower surface of the introducing passage section is located at or lower than a height of a lower surface of the second opening of the bellows part, in a connecting part with the bellows part.

7. The intake system of claim 5, wherein the vibrating membrane is provided so that the first center axis is disposed in a front-and-rear direction of a vehicle.

8. The intake system of claim 7, wherein the introducing passage section is disposed so that a lower surface of the introducing passage section is located at or lower than a height of a lower surface of the second opening of the bellows part, in a connecting part with the bellows part.

9. The intake system of claim 1, wherein the second passage further has a deriving passage section connected to a part of the second passage on the opposite side of the introducing passage section with respect to the intake noise increasing device, and extending toward the cabin, and wherein, when the center axis perpendicular to the vibrating membrane and passing through the membrane center of the vibrating membrane is the first center axis, and a center axis of the deriving passage section is a third center axis, an intersection of the first center axis and the third center axis is disposed on an opening plane of an opening of the deriving passage section on the connection side with the intake noise increasing device.

10. The intake system of claim 1, wherein the introducing passage section is disposed so that a lower surface of the introducing passage section is located at or lower than a height of a lower surface of the second opening of the bellows part, in a connecting part with the bellows part.

11. The intake system of claim 1, wherein the vibrating membrane is provided so that the first center axis is disposed in a front-and-rear direction of a vehicle.

\* \* \* \* \*